Sept. 23, 1969    A. V. BALITSKY ET AL    3,468,561
FLANGED JOINT FOR HIGH-VACUUM SYSTEMS, PARTICULARLY
LARGE SYSTEMS
Filed Feb. 12, 1968    3 Sheets-Sheet 3

United States Patent Office 3,468,561
Patented Sept. 23, 1969

3,468,561
FLANGED JOINT FOR HIGH-VACUUM SYSTEMS,
PARTICULARLY LARGE SYSTEMS
Andrei Vasilievich Balitsky, Varshavskoe shosse 4, kv. 82;
Nikolai Ilich Penkin, Nagornaya ul. 50, korp. 7, kv. 37;
Lev Alexeevich Filatovsky, Savelievsky per. 2/8, kv. 15;
Nikolai Ivanovich Gavrilov, Nagornaya ul. 64, korp.
2-a, kv. 27, and Rostislav Evgenievich Rybchinsky, 3,
Frunzenskaya ul. 3, kv. 131, all of Moscow, U.S.S.R.
Filed Feb. 12, 1968, Ser. No. 704,879
Int. Cl. F16l 55/00, 57/00
U.S. Cl. 285—23
3 Claims

ABSTRACT OF THE DISCLOSURE

A flanged joint for high-vacuum systems in which one of the two flanges to be sealably connected has a recess in which a projection is displaceably and temporarily supported, such that a wire seal can be placed on the projection and held in place by virtue of frictional engagement with said projection so that the other flange can now be mounted on the first flange and clamped thereto, to cause the projection to be lowered into its recess and out of contact with the seal to enable the latter to be deformed between the flanges.

---

This invention relates to high-vacuum and ultra-high-vacuum systems, particularly to large systems, that require repeated heating, and more specifically the invention relates to flanged joints for said systems.

At present, the flanged joints in high-vacuum systems, particularly in large systems, are made in the form of a pair of stepped flanges connected to the system shells, with a metallic seal between the flanges, this seal consisting of wire pulled onto a projection located on one of the flanges. The second flange has a respective recess fitting over the projection of the first flange and serving as a guide surface or mounting surface. Sometimes both flanges have identical recesses facing each other and accommodating a fixed ring which constitutes a projection for the wire seal to be pulled thereon.

Known in the art are designs in which a projection for pulling on the seal has the shape of a cone with a recess, said cone matching with a conical recess in the second flange.

All the existing designs call for a high precision of machining the flanges, especially at the mounting surfaces, otherwise cocking and shifting of the flanges may occur which results in poor and unreliable sealing. Such small tolerances hamper the manufacture of large flanges with metallic seals and especially large noncircular joints which have to be machined on milling machines. The requirements of precision machining of the mounting surfaces and the observance of a precise geometry of the flanges rule out any distortions in the plane of jointing.

An object of this invention is to provide a flanged joint for high-vacuum systems, particularly large systems, which is perfectly reliable in service after repeated heating, does not require close tolerances and has no mounting surfaces.

Another object of this invention is to provide a flanged joint ensuring reliable joining in spite of minor inaccuracies of the flanges in the joining plane.

In accordance with these and other objects the flanged joint for high-vacuum systems, particularly large systems, with a metallic wire seal has, according to the invention, a projection for pulling on the seal, said projection sinking gradually as the flanges are being bolted together.

It is practicable to make the sinking projection in the form of a split ring expanded by a wedge, said ring extending from a recess in the flange being held by temporary mounting supports. This makes it possible, even if there is no accurately machined mounting surface, to provide a projection for pulling on the seal, said projection offering no resistance in tightening the flanges together and allowing the joint to be assembled in any position thereof.

In case of noncircular flanges, it is practicable to make the sinking projection in the form of several pins extending from sockets in the flange being held by temporary mounting supports which makes it possible to pull on the seal along various broken lines and, consequently, to manufacture flanged joints of various shapes and sizes.

The use of the present invention allows the manufacture of high-vacuum and ultra high-vacuum systems with flanged joints of various shapes, unlimited size, and capable of being heated to 450° C. and above.

Other objects and advantages of this invention will be described in detail by way of example with reference to the appended drawing in which.

Figure 1:
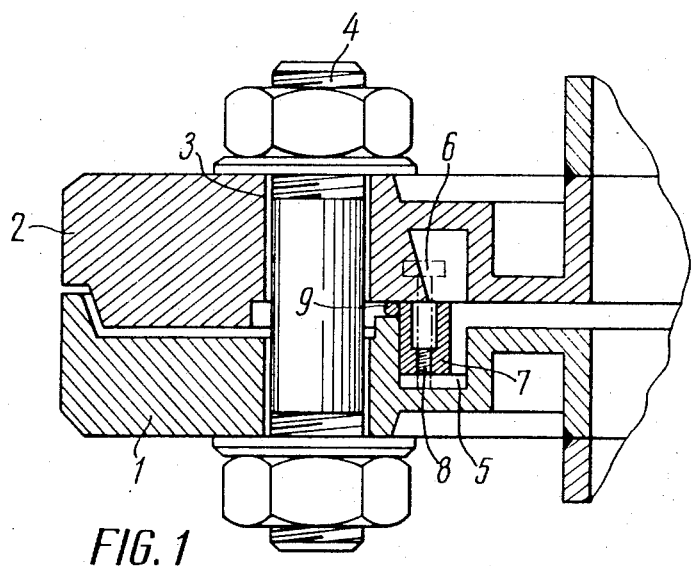
FIG. 1 is a cross section of a flanged joint, assembled but not tightened, according to the invention.

Flanges 1 and 2 (FIG. 1) of detachable joints in high-vacuum systems have a hole 3 for the installation of tightening studs 4.

The lower flange 1 has a circular recess 5 in which a split ring 7 is installed on temporary mounting supports 6, said ring forming a projection which sinks gradually in the course of tightening the flanges 1 and 2 together.

Figure 4:
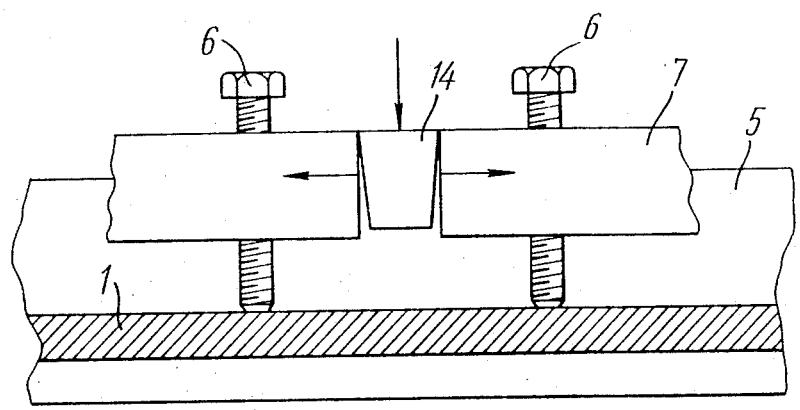
FIG. 4 is an elevation view partly in section of the joint of FIG. 1 in the region of the gap of the split ring.
Figure 5:
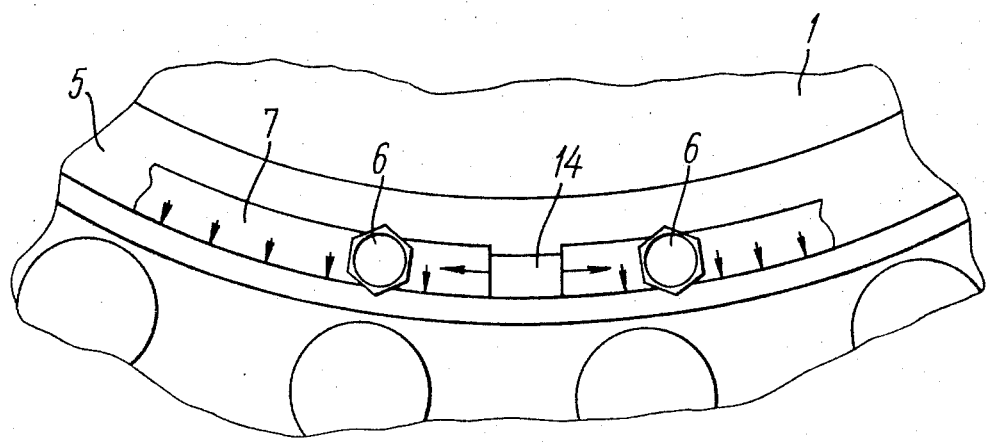
FIG. 5 is a plan view of the portion of the joint of FIG. 4.

The split ring 7 has a number of threaded holes 8 receiving the temporary supports 6; for tight fitting to the surface of the flange the ring 7 is expanded by a wedge 14 as shown in FIG. 4.

Pulled on the temporary projection formed by the ring 7 is a wire seal 9.

Figure 2:
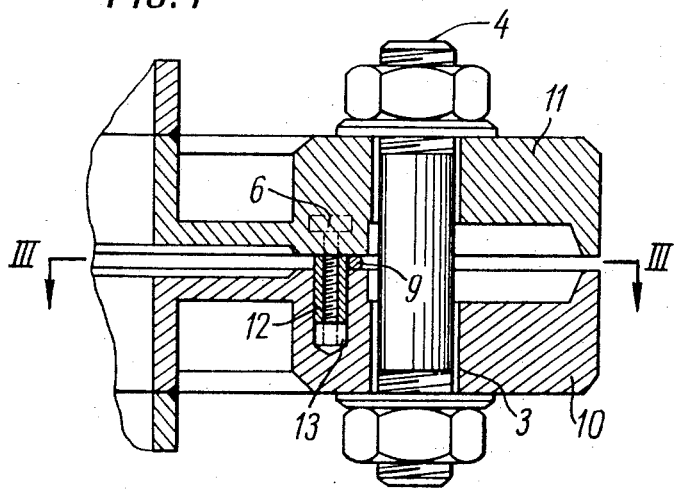
FIG. 2 is a cross section of a rectangular flanged joint, assembled but not tightened, according to the invention.

In the joints with noncircular flanges 10 and 11 (FIG. 2) the sinking projection is formed by a number of pins 12 projecting from recesses 13 in the flange 10 being held by the mounting supports 6.

When assembling a circular flanged joint, the split ring 7 (FIG. 1) is installed in the recess 5 of the flange 1 on temporary mounting supports 6 forming a temporary projection, and is expanded by a metal wedge. The wire seal 9 is pulled on this temporary projection. Then the temporary mounting supports 6 are removed whereas the ring 7 forming the projection is held in position together with the seal 9, due to the force of friction. The flange 2 is brought closer to the flange 1, the tightening studs 4 are inserted into the holes 3 after which the flanges are gradually tightened, thereby compressing the seal 9. As the flanged joint is gradually tightened, the ring 7 sinks into the circular recess 5 of the flange 1 still holding the seal in its place but offering no resistance to tightening of the flanges since the force of friction between the ring 7 and the flange 1 is quite negligible in comparison to the total force of the tightening studs 4.

Figure 3:
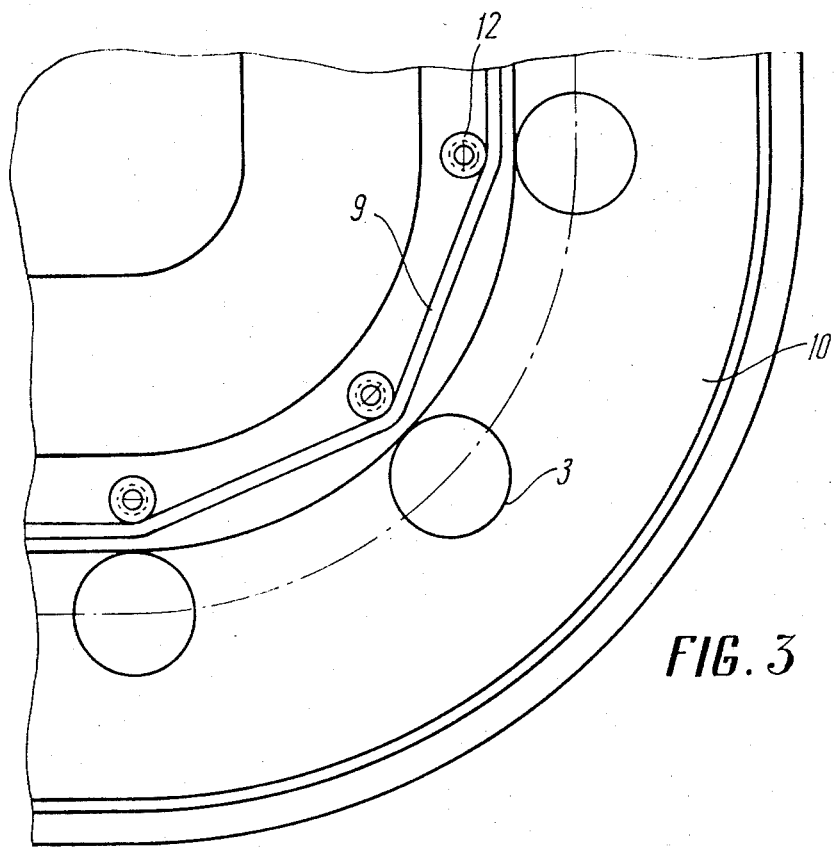
FIG. 3 is a view taken along the line III—III of FIG. 2.

The noncircular joints with sinking projections are assembled in the same manner with a sole difference that in this case the circular sinking projection is replaced by individual sinking pins 12 (FIG. 2) which at first project from the sockets 13 above the surface being sealed and are held by temporary mounting supports 6. The pins 12 are located at the points where it is desirable to bend the seal 9 (to change its direction) as shown in FIG. 3 and at the points where it is desirable to keep the seal from shifting, for instance on long straight sections of sealing. The pins 12 (FIG. 2) are of tubular design with internal threading for screwing in the temporary mounting supports 6. After pulling on the wire seal 9, the temporary supports 6 are removed while the pins 12 forming a sinking projection are held in position by the force of friction created by tightening of the seal 9. Then, the flange 11 being tightened presses the pins 12 into the sockets 13, the seal 9 is compressed and the joint is thus made tight.

The use of the invention proposed herein in high-vacuum systems ensures perfect tightness of the flanged joints, high reliability and a possibility of repeated assembly and disassembly of the joints. The tests have proved that a circular flanged joint with an inside diameter of 1600 mm., provided with a sinking circular projection has been made tight both with a copper and nickel wire seal, being heated with each of the seals 20 times to 450° C. and then several times to 600° C. There has not been a single leak through the joints although they have been checked both cold and hot during each heating-cooling cycle by the use of a helium leak detector with a sensitivity of $3.10^{-7}$ l. micron/sec. by the helium chamber method. The tests included intentionally irregular heating with a temperature difference reaching 250° C. at opposite points of the joint; this test has also been successively passed by the joint. Analogous tests with equal successful results were made on rectangular joints of various sizes up to 3000×1500 mm. with sinking projections in the form of pins.

What we claim is:

1. A flanged joint for high-vacuum systems, said joint comprising flanges which are to be sealably connected, one of said flanges having a recess therein, projection means displaceable within and displaceably supported by engagement with said recess in spaced relation from the bottom thereof, such that the projection means extends outwardly beyond the surface of said flange, a wire located between said flanges and held in place by frictional engagement with the projection means, and means for clamping the flanges together and to cause the projection means to be displaced into the recess and out of contact with the seal to allow the latter to be deformed.

2. A joint as claimed in claim 1 wherein said projection means comprises a split ring and a wedge engaged in the gap of said ring, the joint comprising temporary mounting supports which hold the projection means in said recess until the ring is applied thereon and the wedge is tightened in said gap whereafter the ring and projection means are frictionally engaged and remain in place when the temporary mounting supports are removed prior to clamping the flanges together.

3. A joint as claimed in claim 1 wherein said projection means comprises a plurality of pins extending from the recess in said one flange, the joint comprising temporary mounting supports which hold the projection means in said recess until the ring is frictionally engaged thereon and the ring and projection means remain in place when the temporary mounting supports are removed prior to clamping the flanges together.

References Cited

UNITED STATES PATENTS

| | | | |
|---|---|---|---|
| 1,332,769 | 3/1920 | Souter | 285—364 |
| 1,631,654 | 6/1927 | Stoffel | 285—363 |
| 3,201,725 | 8/1965 | Johnson | 277—236 |
| 3,298,719 | 1/1967 | Bills et al. | 285—368 |

FOREIGN PATENTS

| | | |
|---|---|---|
| 1,093,159 | 11/1967 | Great Britain. |

CARL W. TOMLIN, Primary Examiner

W. L. SHEDD, Assistant Examiner

U.S. Cl. X.R.

29—526; 277—236; 285—27, 363